United States Patent [19]
McHugh et al.

[11] Patent Number: 5,351,019
[45] Date of Patent: Sep. 27, 1994

[54] LOCAL AREA NETWORK INTERFACE AND INTERFACING METHOD FOR NETWORK ELEMENT

[75] Inventors: Thomas J. McHugh; Claude M. Hurlocker; Larry W. Lemonds, all of Raleigh, N.C.

[73] Assignee: Alcatel Network Systems, Inc., Richardson, Tex.

[21] Appl. No.: 990,436

[22] Filed: Dec. 15, 1992

[51] Int. Cl.$^5$ .............................................. H03H 5/00
[52] U.S. Cl. ................................. 333/24 R; 333/156; 333/160; 371/9.1
[58] Field of Search ...................... 333/24 R, 156, 160, 333/124, 136; 370/60, 60.1, 108; 371/9.1

[56] References Cited

U.S. PATENT DOCUMENTS

| | | | |
|---|---|---|---|
| 4,358,823 | 11/1982 | McDonald et al. | 371/9.1 |
| 4,599,585 | 7/1986 | Vorhaus | 333/164 |
| 4,610,013 | 9/1986 | Lang et al. | 371/9.1 |
| 4,654,846 | 3/1987 | Goodwin et al. | 371/9.1 |
| 4,755,778 | 7/1988 | Chapell | 333/159 |
| 4,775,976 | 10/1988 | Yokoyama | 371/9.1 |
| 5,140,691 | 8/1992 | Austruy et al. | 371/9.1 |
| 5,223,809 | 6/1993 | Myer | 333/127 |
| 5,231,640 | 7/1993 | Hanson et al. | 371/9.1 |

FOREIGN PATENT DOCUMENTS 0053301  2/1990  Japan .
1640754  4/1991  U.S.S.R. .

OTHER PUBLICATIONS

"Coaxial and Printed Circuit Delay Lines For Multi Wire Proportional Chamber Readout" High Energy Physics Lab (Stanford University), IEEE Trans. vol. N519 No. 3 Jun. 1972, pp. 148–151.

"Information Technology—Local and metropolitan area networks—Part 3: Carrier sense multiple access with collision detection (CSMA/CD) access method and physical layer specifications", ANSI/IEEE Std. 802.3, International Standard ISO/IEC 8802-3:1992, Third edition, Section 10, Medium Attachment Unit and Baseband Medium Specifications, Tyep 10BASE2, pp. 185, 202–4.

Primary Examiner—Robert J. Pascal
Assistant Examiner—Darius Gambino
Attorney, Agent, or Firm—Dennis O. Kraft

[57] ABSTRACT

A local area network interface for a network element having redundant processors is made by using a pair of connectors for each processor. A delay line is used between pairs of connectors for non-redundant LAN configurations. For redundant LANs, the delay line is not used.

4 Claims, 4 Drawing Sheets

FIG. 2
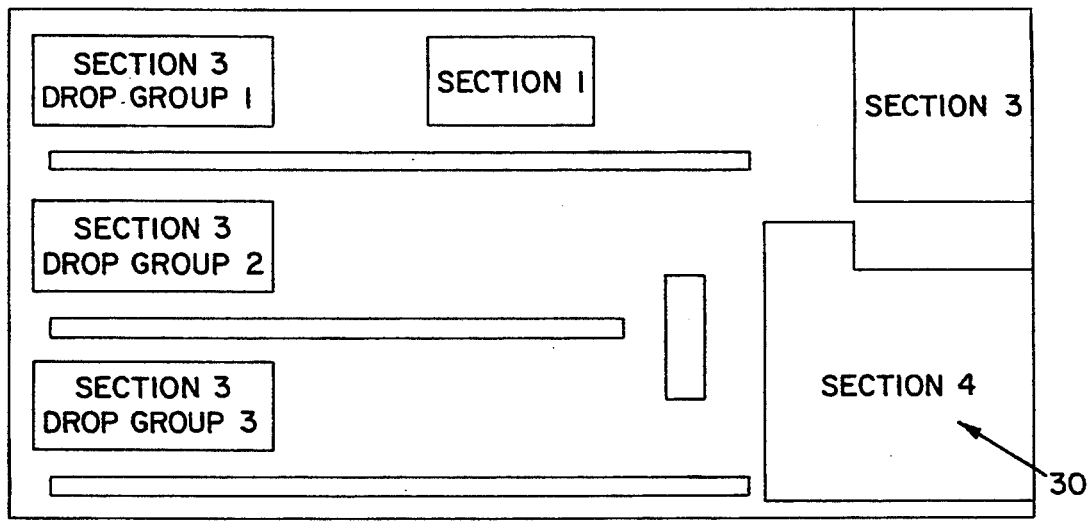
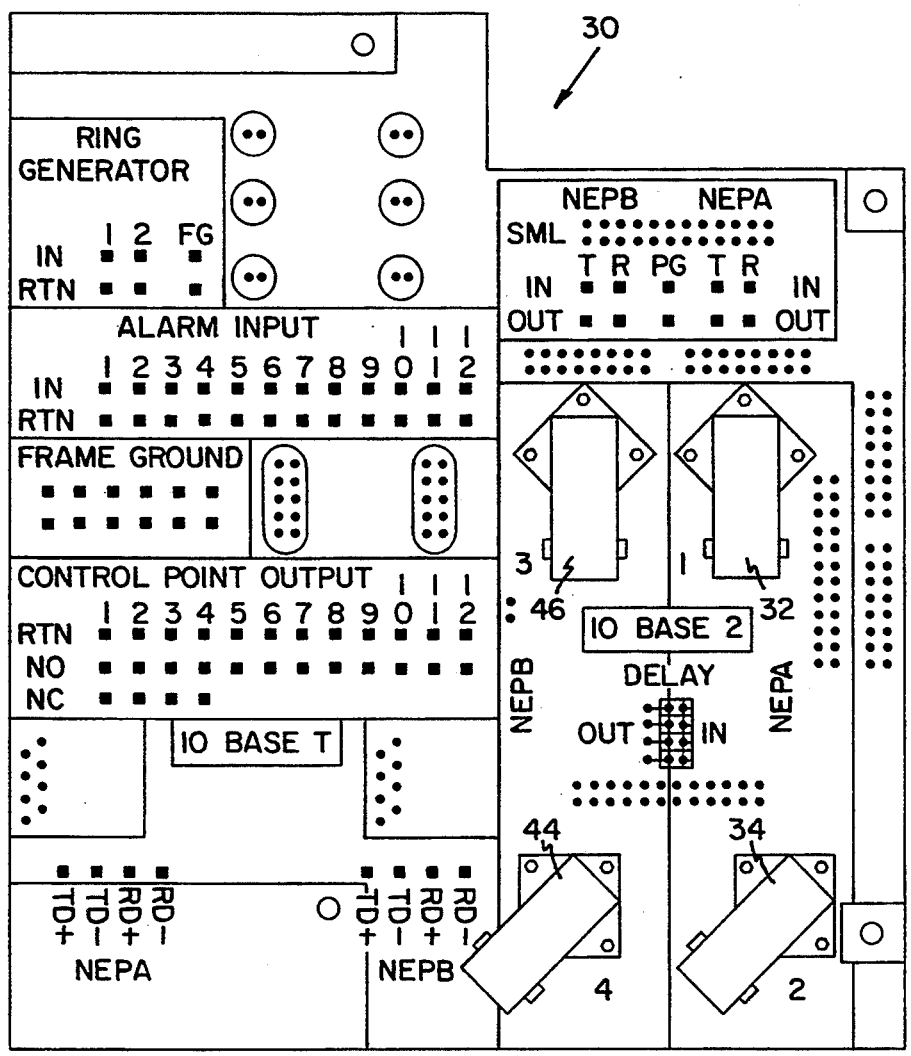
FIG. 3

LOCAL AREA NETWORK INTERFACE AND INTERFACING METHOD FOR NETWORK ELEMENT

TECHNICAL FIELD

This invention relates to electrical interface connections for local area networks and, more particularly, for interfacing local area networks to network elements having redundant processors.

BACKGROUND OF THE INVENTION

Present network designs often provide for redundant processors in each network element. For example, redundant processors are to be provided for synchronous optical network (SONET) elements with only one processor active for communicating on a local area network (LAN) via a single, thin wire Ethernet connector.

The known ANSI IEEE standard 802.3 ISO/IEC 8802-3 entitled "Information Processing Systems-Local Area Networks—Part 3: Carrier Sense Multiple Access with Collision Detection (CSMA/CD) Access Method and Physical Layer Specifications" specifies typical requirements. Such specifications deal with several types of interconnections including "10 base 2, 10 base 5, 10 base T," etc. The 10 base 2 specification deals with thin wire coaxial Ethernet local area networks operating at 10 megabits per second with a maximum span of 185 meters. The other two above-mentioned specifications deal with thick coax up to 500 meters (10 base 5) and twisted pairs (10 base T).

It is the known practice to provide a network element processor access to a local area network by means of a medium access unit (MAU). The MAU comprises electronics and associated connectors to allow the attachment of devices to the LAN medium comprising, e.g., a thin wire coaxial cable for 10 base 2. The MAU includes a coaxial transceiver and a BNC connector typically mounted on a printed board assembly (PBA) in a rack or shelf of electronic cards together comprising a network element.

Within the MAU is a coaxial transceiver comprising electronic circuitry that transmits and receives data. In order to connect to the LAN medium, a BNC "T" connector adapter is usually provided on the edge of the printed board assembly in close proximity to the MAU in order to keep the capacitance less than six picofarads as required by IEEE 802.3. The electrical "T" is the actual point of connecting the MAU to the network, i.e., where the signal is actually split out.

As known, synchronous optical network (SONET) equipment requires a single 10 base 2 connector visible to the user. SONET equipment also requires two redundant 10 base 2 MAUs connected to the same single LAN with only one MAU active at a time. There are both electrical and mechanical difficulties in implementing a design that meets both of these requirements.

Mechanical limitations of SONET equipment will not allow locating the traditional 10 base 2 connectors directly on the printed board assemblies which contain the MAU, as is recommended by IEEE 802.3, and which is the current state of the art. In other words, mechanical restrictions of SONET equipment do not allow placing a BNC "T" connector adapter at the printed board assembly edge.

Electrical limitations in meeting the IEEE 802.3 electrical specifications include minimum distance between 10 base 2 "nodes" (nodes meaning the usual BNC "T" connector adapters and the associated MAU and processor) of 0.5 meter, and the maximum capacitance of less than six picofarad between the MAU, located on the printed circuit board and the electrical "T" connection.

As far as can be determined, the state of the art is presently for the problem to be avoided by providing only one non-redundant MAU and Ethernet controller per LAN. However, this merely avoids the problem and does not lock to the future where we believe eventually it will be required to provide for two redundant Ethernet controllers per SONET network element, per local area network. This means that there will be two LANs per network element for a total of four Ethernet LAN controllers per network element. Note that redundant Ethernet controllers should be set up in a fail-safe fashion where each of two redundant main processing printed circuit boards has both an Ethernet controller and a MAU but only one main processor (and its Ethernet controller and MAU) can be active at a time.

Existing solutions will not support redundant MAUs on the same LAN. Moreover, only one external MAU/LAN connection on the chassis is typically allowed.

Therefore, it will be impossible to easily upgrade two redundant systems using existing solutions. The above future requirement is thus for two LAN connections since it is anticipated that redundancy will eventually be required.

DISCLOSURE OF INVENTION

An object of the present invention is to provide a LAN interface that meets accepted specifications.

Another object of the present invention is to provide a more flexible local area network interface connection for a network element.

According to the present invention, instead of providing the two "T" coaxial connectors for the redundant processor cards, two electrically bridged connectors are provided per redundant processor.

In further accord with the present invention, the electrical bridge is external to the card.

In still further accord with the present invention, one connector from each redundant processor can be connected via a delay line for a non-redundant LAN configuration.

In further accord with the present invention, for a redundant LAN configuration, the delay line is removed.

These teachings represent a contribution to the art. that meets current conditions and is also adaptable to future requirements. It allows either network processor to be a true node without violating the accepted specifications.

These and other objects, features and advantages of the present invention will become more apparent in light of the detailed description of a best mode embodiment thereof, as illustrated in the accompanying drawing.

BRIEF DESCRIPTION OF THE DRAWING

FIG. 2 is a rear view of the network element of Fig. 1 with various sections illustrated.

FIG. 3 is a detail of section 4 of the rear view of FIG. 2 showing a LAN interface, according to the present invention.

BEST MODE FOR CARRYING OUT THE INVENTION

Figure 1:
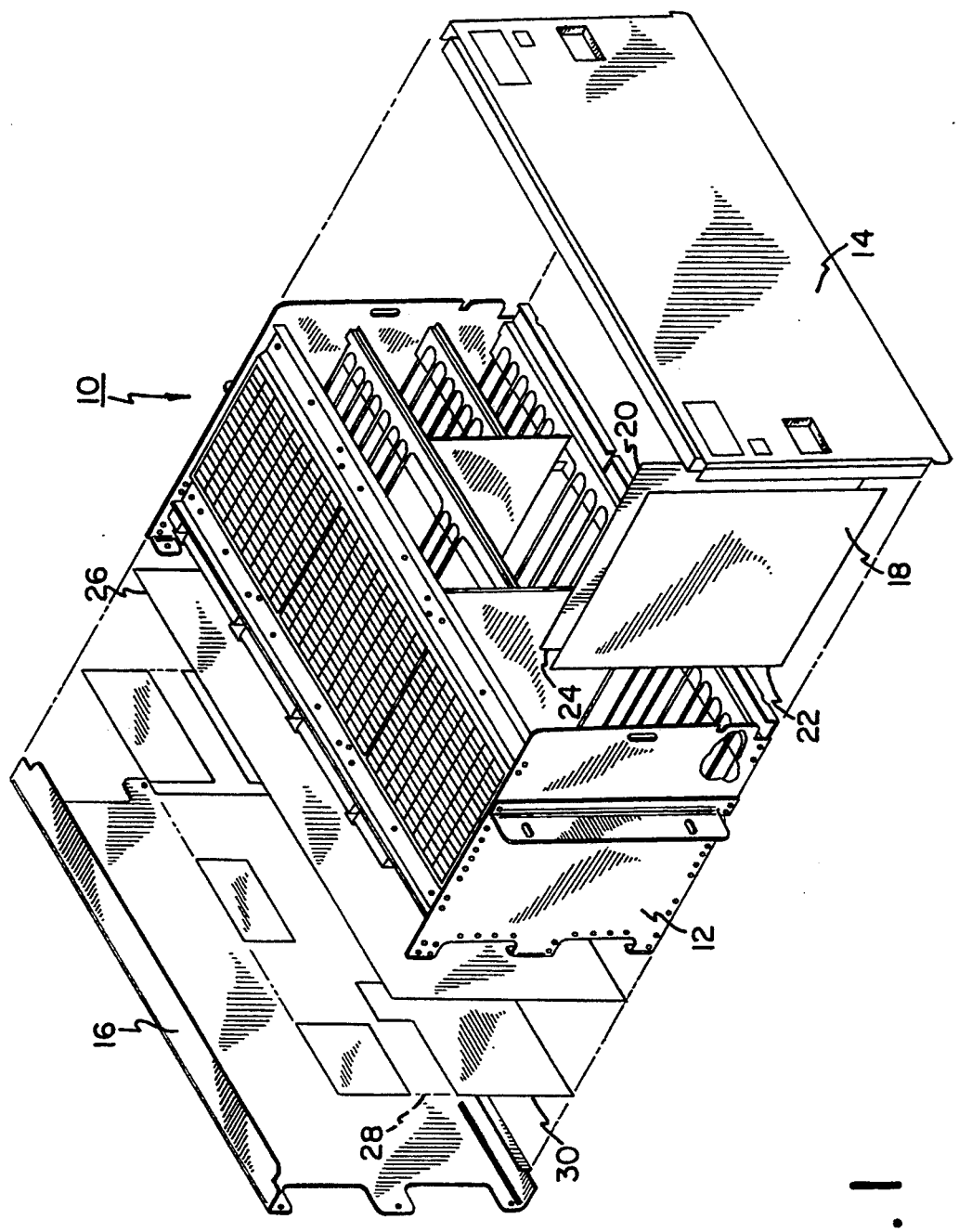
FIG. 1 is an isometric view of an add-drop multiplexer shelf, being and example of a network element.

FIG. 1 shows an add drop multiplexer shelf 10 in an isometric view. The shelf includes a rack 12 having a front cover 14 and a rear cover 16 shown in FIG. 1 with the covers 14, 16 off. The shelf 10 comprises a network element having a number of printed circuit board assemblies mounted therein. Two such boards 18, 20 are shown in FIG. 1 removed from the rack but which would be inserted therein with the illustrated orientation along with numerous other boards to form a full assembly. At edges 22, 24 of the boards there will typically be mounted electrical interfacing means such as plug-in pins for insertion in receptacles in a shelf backplane 26 which is parallel to the rear cover 16 but attached inside the rack for mating with the various other printed circuit boards. Of course, the boards 18, 20 may contain the receptacles and the shelf backplane 26 (or motherboard) may contain the pins. This is not important for the present invention, as either approach or any other equivalent approach may be taken. In any event, the motherboard 26 constituting the shelf backplane will have various printed circuits on the surface or surfaces thereof or even imbedded therein for interconnecting the boards and various output interface devices for connecting to the outside world.

Such connectors and other devices for interfacing outside the network element may be mounted on a motherboard or on an additional backplane 28, shown as a dotted line, which may be called a sub-backplane. Such may form an additional motherboard layer in a single piece or in separate pieces, as shown. This sub-backplane 28 may have additional printed circuits thereon or therein and various connectors protruding through openings (not shown) in the back cover 16 for user access. Electrical connections may be made in any convenient manner with pins, sockets, or the like.

FIG. 2 shows a rear view of the shelf 12 of FIG. 1 with various sections denoted as being devoted to various functions. For example, a section 3 is devoted to subscriber drops. Another section 30, which is shown in detail in FIG. 3, includes the two circuit boards 22, 24 of FIG. 1 in the lower right hand corner thereof which, for the embodiment shown, constitute redundant network element processors A and B.

Figure 4:
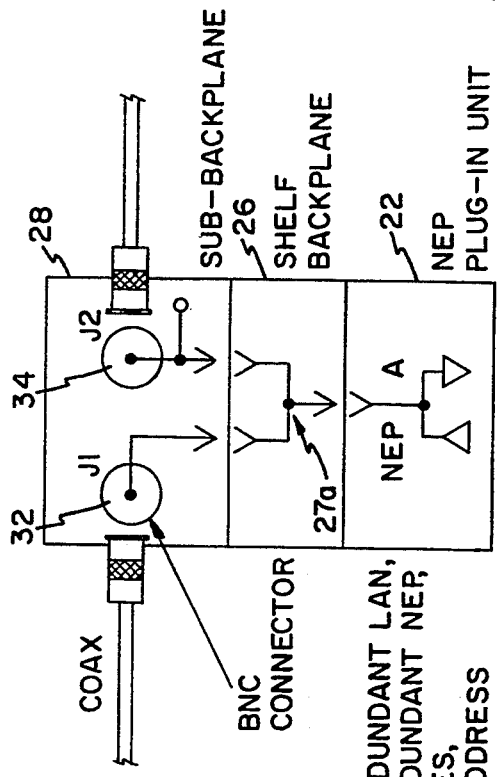
FIG. 4 illustrates a 10 base 2 non-redundant LAN interface to a network element having a non-redundant network element processor, and having connectors and connections made.

According to an important teaching of the present invention, the redundant network element processors on cards 22, 24 are interfaced to the shelf backplane 26 in such a way that the shelf backplane contains the printed wiring to constitute a "T". The ends of the top part of the T emerge from the shelf backplane for connection to a pair of straight connectors 32, 34, as shown in FIG. 3 for network element processor A. This is illustrated schematically in FIG. 4 wherein the connectors 32, 34 are shown as BNC-type connectors in the sub-backplane 28 connected by means of male pins to female sockets in the shelf backplane 26 forming a T node (27a) which in turn connects by way of a male pin to a female socket in the network element processor plug-in unit 22. In the absence of a redundant network element processor board 24 (processor B) this would be the desired hook-up for a non-redundant LAN, non-redundant network element processor configuration, according to the present invention.

Figure 5:
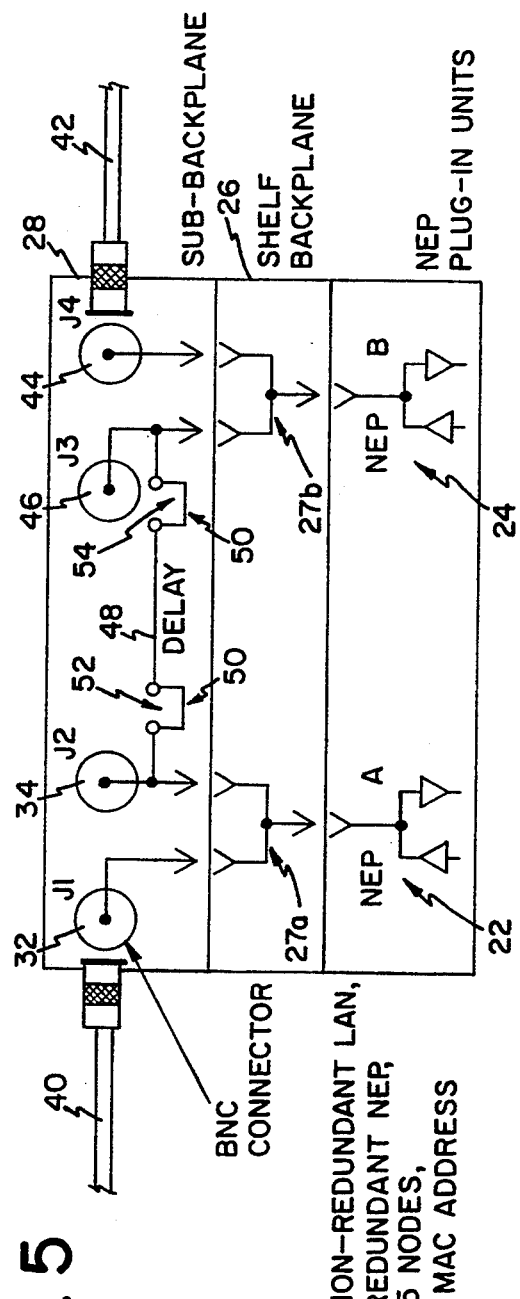
FIG. 5 is an illustration of a 10 base 2 LAN interface, according to the present invention, for a non-redundant LAN interface to a network element having redundant network element processors.

According to further teachings of the present invention, FIG. 5 illustrates a non-redundant LAN redundant network element processor configuration in which a single local area network is interfaced to both the redundant processors in the network element by means of an input cable 40 connected to connector 32 as an input connector, for example, and an output cable 42 connected to a connector 44 used in this case as an output connector. As can be seen in FIG. 5, the configuration shown in FIG. 4 for network element processor A has been replicated for network element processor B in the shelf backplane (with an added T-node 27b) and sub-backplane. Because of tight space constraints in SONET network element requirements, and because of the physical separation distance of one half meter required by LAN specifications such as IEEE 802.3, a delay line 48 is provided, according to the invention, between the two nodes 32, 34 and 44, 46. The delay line may comprise a microstrip imprinted on the sub-backplane and having a selected impedance to provide the desired delay between nodes.

Referring back to FIG. 3, it will be seen that in the embodiment shown, BNC type connectors are provided for the connectors 32, 34 and 44, 46 and are in very close proximity, being separated by only a few centimeters. However, with the delay line 48 inserted between connector 34 and connector 46, as shown in FIG. 5, the network element processors are effectively provided with sufficient delay to constitute electrically separated nodes (27a, 27b) in the sense required by the separation requirements of the local area network specifications. Of course, it will be realized that the delay line 48 may be imprinted in the shelf backplane as well, although accessibility might suffer, as will become evident in connection with the description of added flexibility provided by the disclosed approach in connection with redundant LANs.

It will be observed in FIG. 5 that a pair of jumpers 50 are used to connect the delay line 48 to the connectors 34, 46. The placement and removal of the jumpers 50 is facilitated by a pair of terminals 52 and another pair 54 associated with the respective connectors 34, 46.

Figure 6:
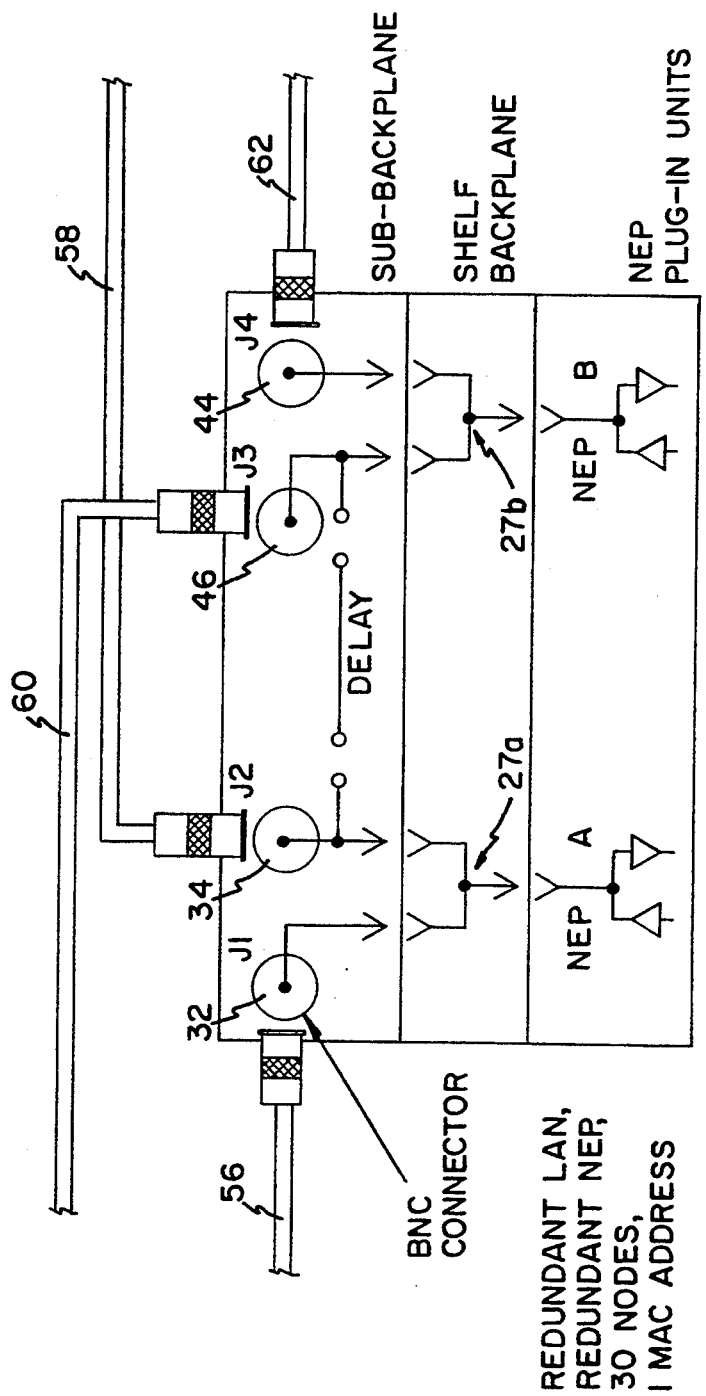
FIG. 6 shows a modification of FIG. 5 wherein a redundant LAN is interfaced to the network element of FIG. 5 having redundant network element processors.

Referring now to FIG. 6, the set-up of FIG. 5 is shown used to advantage for a redundant LAN, redundant network element processor configuration. In the set-up of FIG. 6, a first LAN comprising an input cable 56 and an output cable 58 is associated with network element processor A. Cable 56 is attached to connector 32 and cable 58 is connected to connector 34. Again, this constitutes a first LAN associated with network processor A. By removing the jumpers 50 of FIG. 5, processor B can become part of a second LAN with a cable 60 to connector 46 and with a cable 62 connected to connector 44 which together constitute a second LAN associated with network processor B. Although, for this configuration, the separate nodes are closer than would be allowed if they were in the same network, since they are in different networks the proximity is not violative of LAN specifications.

Thus, for the embodiment shown, we have provided a single LAN connection for each processor on a chassis. The individual LAN connections consists of two separate female coaxial connectors instead of the traditional single coaxial connector with a "T" adapter. The two electrical "T's" are each formed by four adjacent backplane pin/socket/connector configurations.

It should be realized, that instead of using printed circuits in the shelf backplane and sub-backplane, we could have used actual cables instead such as Gore coaxial cables to provide the connections between the chassis coaxial connectors and the processors and between the processors themselves. It should also be realized that for the embodiment of FIG. 5, only one of the two Ethernet MAUs coaxial transceivers will be transmit enabled at a time. This is necessary since both network element processors have the same IEEE 802.3 Medium Access Control (MAC) address. Both coaxial transceivers will be transmit disabled on POR, or when a microprocessor watchdog fault has been detected. Otherwise, the control system will ensure that only the active network processor can be transmit enabled.

The less than six picofarad requirement can be met because the backplane connector has a less than 3 picofarad total pin capacitance.

Thus, we have taught a solution that will meet current and future requirements which allows either network processor to be removed without bringing down the local area network. If one network processor fails, the other can assume the network element address identification on the local area network.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A local area network interface for a network element having redundant processors, comprising:

a first pair of connectors connected to a first node for connection to a first one of the redundant processors; and a second pair of connectors connected to a second node for connection to a second one of the redundant processors; and a delay line connectable between the first node and the second node.

2. A method of providing a network element interface for a local area network, comprising the steps of:

providing a separate pair of connectors for each of a plurality of network element processors;

connecting each separate pair of connectors to a correspondingly separate node within the network element;

connecting each node to a corresponding network element processor; and connecting a connectable delay line between a first pair of connectors and a second pair of connectors for providing a selected delay between the corresponding network element processors used as redundant processors wherein one of the first pair of connectors is for connection to an input line of the local area network and wherein one of the second pair of connectors is for connection to an output line of the local area network.

3. The method of claim 2, wherein each separate pair of connectors is for connection as an input and output connection pair for corresponding separate local area networks.

4. The network interface of claim 1, wherein the delay line is connectable between the first and second nodes by means of:

a first pair of jumper connections, a first jumper connection thereof connected to the first node and a second jumper connection thereof connected to a first end of the delay line; and a second pair of jumper connections, a first jumper connection thereof connected to the second node and a second jumper connection thereof connected to a second end of the delay line.

* * * * *